June 29, 1937.                H. K. WEIHE                 2,085,620
                        HYDRAULIC PRESSURE DEVICE
                          Filed June 12, 1935

H. K. Weihe
Inventor

By Glascock Downing Seebold
                    Attys

Patented June 29, 1937

2,085,620

UNITED STATES PATENT OFFICE 2,085,620

HYDRAULIC PRESSURE DEVICE

Hermann Kurt Welhe, Berlin, Germany

Application June 12, 1935, Serial No. 26,267
In Germany June 12, 1934

2 Claims. (Cl. 60—54.6)

This invention relates to a hydraulic pressure device, more particularly a brake, wherein a threaded spindle adapted to be operated by hand drives a piston in a pressure cylinder and places the liquid column, which is in front of the piston, under pressure which is transmitted in a known manner through a pressure pipe. In such pressure devices, it is necessary to maintain the pressure once produced for a long period. Owing to special circumstances, for instance, owing to the contraction of the fluid due to the reduction of the outer temperature or to leakage in the pressure system, losses of pressure may occur which are not perceptible externally.

The present invention has for its object to provide a simple arrangement whereby a reduction of pressure in the pressure device is rendered easily visible to the operator so that the defect can be immediately remedied. The present invention is characterized by the arrangement of an indicating device, which consists of a rod connected to the piston in the pressure cylinder, the said piston being actuated by a pressure spring. The rod passes through the hollow driving spindle and indicates the position of the piston externally. The driving spindle is advantageously arranged in such a manner that it is easily reached and visible from the driver's seat.

The device according to the invention is illustrated in a constructional example in the accompanying drawing, in which.

Figure 1:
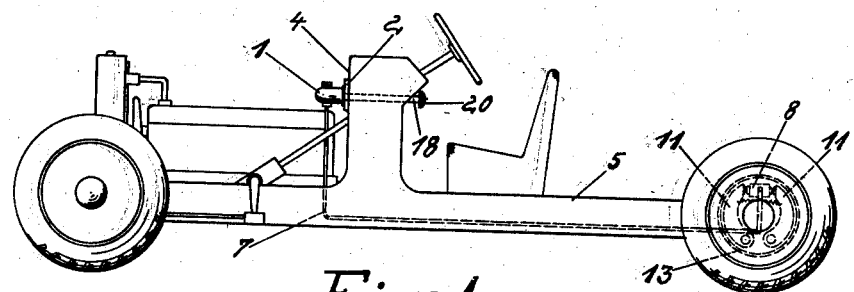
Fig. 1 shows an automobile in elevation with the new pressure device acting as hand brake.
Figure 2:
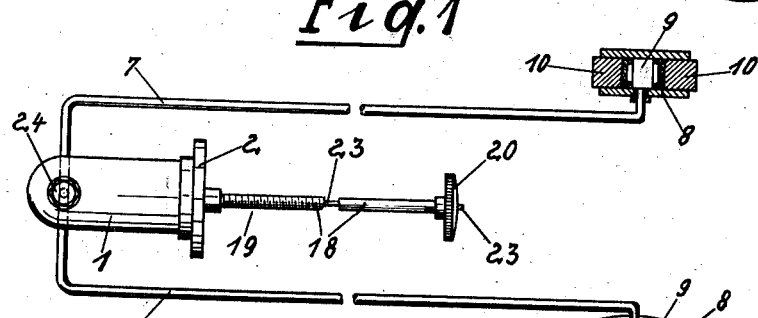
Fig. 2 illustrates the essential parts of the hydraulic pressure device diagrammatically.

In the drawing 1 is a pressure cylinder, which is secured by means of the flange 2 and screws 3 on to the dash-board 4 of the automobile 5. 6 is a connection for the brake pipe 7 from the pressure cylinder 1 leading to the wheel braking cylinders 8 of the vehicle. The pipe 7 opens into the pressure space 9 of the wheel brake cylinder. The two oppositely moving pistons 10 of each brake cylinder co-act with the brake blocks 11 which are drawn together by tension springs 12 as long as they are not forced apart by the pressure prevailing in the space 9 when the brakes are applied and press against the brake drum 13 of the vehicle wheels.

Figure 3:
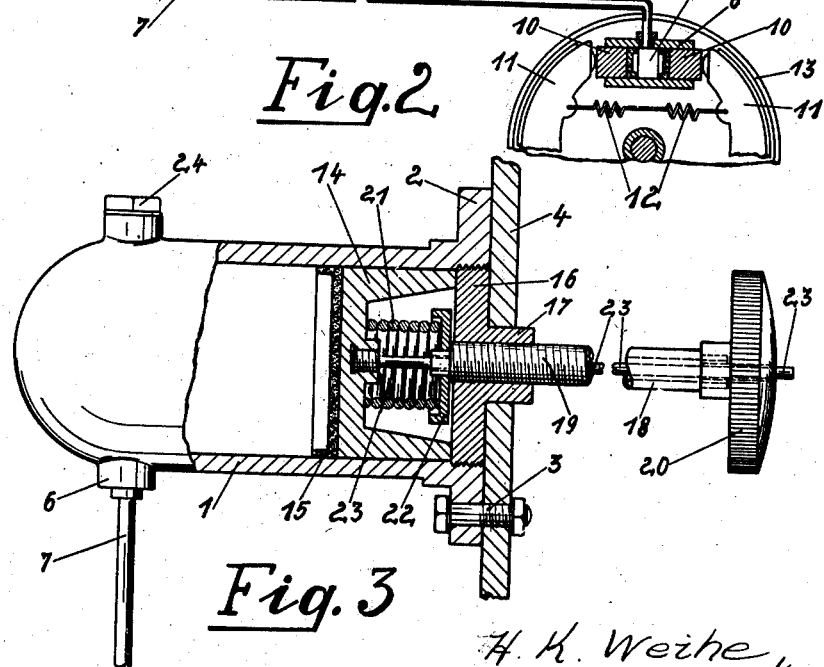
Fig. 3 shows the pressure cylinder with the piston which is driven by hand through a threaded spindle in part longitudinal section.

In the pressure cylinder 1 the piston 14 is guided, the front end of which carries a packing 15 preferably of rubber. The pressure cylinder is closed at the rear end by the inserted cover 16, which on the outer side carries a bearing bush 17. The cover 16 also limits the rearward motion of the piston 14. This is driven by a hollow spindle 18 having an external thread 19 at the end further from the piston, which screws into a thread in the cover 16 of the cylinder. On the other free end the hollow spindle 18 has a hand knob 20 firmly secured thereto, which is arranged so as to be easily reached from the driver's seat (see Fig. 1). Between the piston 14 and the threaded spindle 18, 19 a spring 21 is interposed. This spring rests at one end on the back of the piston 14, and at the other end against the spring member 22, which in its turn rests against the driving spindle 18. The interposed spring 21 which, as shown in Fig. 3 is enclosed on all sides is weaker than the return spring 12 for the brake blocks 11.

On the rear side of the piston there is secured in the centre in a suitable manner a thin rod 23 which passes axially through the hollow spindle 18 and the spindle 20, and projects a little way out of the latter, so as to be visible.

The individual parts of the pressure device described are preferably arranged axially one behind another so that they can be built into the pressure cylinder as a unit, and if necessary removed again.

When the handle 20 is turned the spindle 18, 19 is screwed into the cover 16. If the spindle is screwed forward in the direction of the piston 14 it presses against the spring plate 22. The pressure is transmitted through the spring 21 to the piston which is moved forward a corresponding distance in the cylinder 1. With the piston forward in the cylinder 1 the fluid pressure in the system is increased, and, if necessary, can be increased to such an extent that the brake blocks 11 are forced against the brake drum 13. In this case the pressure device acts as a hand brake.

By means of the pressure device described and illustrated in the drawing any desired pressure can be obtained by hand in my improved hydraulic brake system so that it is possible to regulate and adjust the pressure or initial tension in the system very accurately. The use of a threaded spindle for driving the piston 14 makes it unnecessary to provide special fixing means for keeping the pressure piston in a desired position.

The driving spindle 18 cannot rotate unintentionally and when the operating handle 20 is adjusted, the pressure corresponding to the actual position of the piston in the cylinder is maintained.

When there is a drop in fluid pressure due to external temperature influence or leakage, the pressure spring 21, which is subjected to great tension, moves the piston 14 forward so that the loss of pressure is immediately compensated. The fluid pressure once fixed is thereby always maintained provided that the liquid has not completely escaped.

By means of a rod 23 which is connected with the piston 14 and projects beyond the handle 20 so as to be visible, the actual state of the brake is indicated to the driver. The rod 23 takes part in the movements of the piston 14. If, for example, there is a loss of fluid resulting in the piston being moved forwards by the spring 21 this will be recognized by the free end of the rod 23 projecting out of the handle 20 being retracted. If this end is no longer visible, having been drawn right back into the handle, the driver has an exact indication of the actual state of the brake. If necessary the cap 24 must be screwed off and more liquid filled in.

What I claim is:—

1. A hydraulic hand brake for automobiles or the like, comprising a fluid cylinder, a piston in said cylinder movable therein for actuating the brake, a spindle for driving said piston, spring means interposed between the piston and said spindle and acting on said piston for automatically regulating the pressure in said cylinder, and a rod secured at one end to said piston and extending axially through the spindle for indicating the position of the piston in said cylinder.

2. A hydraulic hand brake for automobiles or the like, comprising a fluid cylinder, a piston in said cylinder movable therein for actuating the brake, a spindle extending into said cylinder for actuating said piston, spring means in said cylinder interposed between the piston and said spindle and acting on said piston for automatically regulating the pressure in said cylinder, and a rod having one end secured to the piston and extending axially through the spindle outside the cylinder for indicating the position of the piston within said cylinder.

HERMANN KURT WEIHE.